(12) United States Patent
Wang et al.

(10) Patent No.: US 12,465,172 B2
(45) Date of Patent: *Nov. 11, 2025

(54) AIR COOKING DEVICE

(71) Applicant: IB APPLIANCES US HOLDINGS LLC, Downers Grove, IL (US)

(72) Inventors: Hongyuan Wang, Hangzhou (CN); Yude Han, Zhejiang (CN); Jiwei Wang, Ottawa (CA)

(73) Assignee: IB APPLIANCES US HOLDINGS, LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/438,769

(22) Filed: Feb. 12, 2024

(65) Prior Publication Data
US 2024/0180364 A1    Jun. 6, 2024

Related U.S. Application Data

(63) Continuation of application No. 17/390,488, filed on Jul. 30, 2021, now Pat. No. 11,930,959.

(30) Foreign Application Priority Data

Sep. 1, 2020    (CN) .......................... 202010905476.5

(51) Int. Cl.
*A47J 37/06*    (2006.01)
*A47J 36/38*    (2006.01)

(52) U.S. Cl.
CPC ........... *A47J 37/0641* (2013.01); *A47J 36/38* (2013.01)

(58) Field of Classification Search
CPC .............................. A47J 36/38; A47J 37/0664
See application file for complete search history.

(56) References Cited

U.S. PATENT DOCUMENTS

3,801,331 A * 4/1974 Sano et al. .............. A47J 37/12
                                                                 99/403
4,734,562 A    3/1988 Amano et al.
(Continued)

FOREIGN PATENT DOCUMENTS

CN    1148144 C    5/2004
CN    1717189 A    1/2006
(Continued)

OTHER PUBLICATIONS

Machine translation of CN 101336354 A1 performed on Nov. 25, 2024, Wilson et al. (Year: 2008).*
(Continued)

*Primary Examiner* — Ibrahime A Abraham
*Assistant Examiner* — Kevin Guanhua Wen
(74) *Attorney, Agent, or Firm* — Crowell & Moring LLP (57) ABSTRACT

An air cooking device includes a main unit and a drawer structure, wherein the main unit is provided with an internal cavity, and the drawer structure includes a drawer panel and a frying bucket fixed on the back side of the drawer panel. The drawer structure can be pushed into the cavity to perform the operation of air frying cooking. The main unit includes a top wall above the cavity, and the air cooking device also includes a sealing element, with the sealing element being provided between a mouth portion of the frying bucket and the top wall of the cavity to prevent oil fumes in the frying bucket from escaping between an edge of the mouth portion of the frying bucket and the top wall of the cavity.

20 Claims, 7 Drawing Sheets

(56) References Cited

U.S. PATENT DOCUMENTS

| | | | |
|---|---|---|---|
| 5,367,949 A | 11/1994 | Nitschke et al. | |
| 6,851,351 B2 | 2/2005 | Payen et al. | |
| 9,351,495 B2 | 5/2016 | McFadden | |
| 9,980,605 B2 | 5/2018 | De Haas et al. | |
| 2005/0223906 A1* | 10/2005 | Xu et al. | A23L 1/00 99/348 |
| 2010/0139032 A1* | 6/2010 | Tomasiak | A47L 9/10 15/347 |
| 2018/0035698 A1* | 2/2018 | McNerney et al. | A23L 5/10 |
| 2018/0255971 A1 | 9/2018 | Moon et al. | |
| 2019/0059647 A1 | 2/2019 | Floessholzer | |

FOREIGN PATENT DOCUMENTS

| | | | |
|---|---|---|---|
| CN | 101336354 A | 12/2008 | |
| CN | 101336354 A1 * | 12/2008 | F24C 15/16 |
| CN | 201948829 U | 8/2011 | |
| CN | 203195499 U | 9/2013 | |
| CN | 203234602 U | 10/2013 | |
| CN | 203407931 U | 1/2014 | |
| CN | 203776719 U | 8/2014 | |
| CN | 203776727 U | 8/2014 | |
| CN | 104138222 A | 11/2014 | |
| CN | 103536188 B | 9/2015 | |
| CN | 204708660 U | 10/2015 | |
| CN | 107072441 A | 8/2017 | |
| CN | 206371941 U | 8/2017 | |
| CN | 107713786 A | 2/2018 | |
| CN | 107822524 A | 3/2018 | |
| CN | 107898334 A | 4/2018 | |
| CN | 108471907 A | 8/2018 | |
| CN | 108552966 A | 9/2018 | |
| CN | 207804077 U | 9/2018 | |
| CN | 208048605 U | 11/2018 | |
| CN | 208463763 U | 2/2019 | |
| CN | 208582202 U | 3/2019 | |
| CN | 209003633 U | 6/2019 | |
| CN | 209018508 U | 6/2019 | |
| CN | 209058899 U | 7/2019 | |
| CN | 209058909 U | 7/2019 | |
| CN | 209391737 U | 9/2019 | |
| CN | 209436925 U | 9/2019 | |
| CN | 209436989 U | 9/2019 | |
| CN | 209437013 U | 9/2019 | |
| CN | 110494069 A | 11/2019 | |
| CN | 110507217 A | 11/2019 | |
| CN | 110507217 A1 * | 11/2019 | A47J 37/0641 |
| CN | 209629508 U | 11/2019 | |
| CN | 110584465 A | 12/2019 | |
| CN | 209712616 U | 12/2019 | |
| CN | 110693338 A | 1/2020 | |
| CN | 210185299 U | 3/2020 | |
| CN | 210446767 U | 5/2020 | |
| CN | 111214133 A | 6/2020 | |
| CN | 210697274 U | 6/2020 | |
| CN | 213909743 U | 8/2021 | |
| CN | 214017175 U | 8/2021 | |
| CN | 216166980 U | 4/2022 | |
| EP | 2254422 B1 | 4/2014 | |
| EP | 2716193 B1 | 1/2016 | |
| EP | 3583878 A1 | 12/2019 | |
| FR | 3082412 A1 | 12/2019 | |
| KR | 10-2013-0089449 A | 8/2013 | |
| KR | 101623329 B1 * | 5/2016 | A47J 36/38 |
| WO | WO-2017164378 A1 * | 9/2017 | A47J 31/40 |

OTHER PUBLICATIONS

Machine translation of CN 110507217 A1 performed on Nov. 25, 2024, Guo et al. (Year: 2019).*

Machine translation of KR 101623329 B1 performed on Nov. 25, 2024, Lee (Year: 2016).*

Machine translation of WO 2017164378 A1 performed on Nov. 25, 2024, Kiji et al. (Year: 2017).*

U.S. Appl. No. 17/379,307, filed Jul. 19, 2021, Wang et al.

U.S. Appl. No. 17/390,416, filed Jul. 30, 2021, Wang et al.

U.S. Appl. No. 17/390,450, filed Jul. 30, 2021, Han et al.

T-fal Odorless Stainless Steel lean Deep Fryer with Filtration System, 3.5-Liter, Silver, https://www.walmart.com/ip/T-fal-Odorless-Stainless-Steel-lean-Deep-Fryer-with-Filtration-System-3-5-Liter-Silver/141560833. Accessed Apr. 19, 2022, 7 pgs.

European Search Report for European Patent Application No. 21190397.6 dated Feb. 2, 2022, 8 pages.

European Search Report for European Patent Application No. 21185482. dated Dec. 8, 2021, 8 pages.

* cited by examiner

AIR COOKING DEVICE

RELATED APPLICATION

This application is a continuation of U.S. Non-Provisional patent application Ser. No. 17/390,488, filed Jul. 30, 2021, pending, which claims priority to Chinese Patent Application Number CN2020109054765, filed Sep. 1, 2020, the entireties of which are hereby incorporated by reference.

FIELD

This application is related to the field of small household appliances, and particularly related to an air cooking device.

BACKGROUND

Air cooking devices are being used by more and more consumers. Different from the conventional method of frying with hot oil, air cooking devices use air as a heat transfer carrier to effectively reduce the oil content of the ingredients and provide users with a healthy diet. The current air cooking devices can be basically divided into two types: drawer type and clamshell type. The relevant drawer type air cooking device includes a main unit and a drawer structure assembled on the main unit. When using the air cooking device, oil fumes may easily enter a cavity of the main unit, contaminating the outer side of the frying bucket and the inner side of the main unit, which is not easy to clean and may affect a user's experience with the air cooking device.

SUMMARY OF THE DESCRIPTION

This application provides an air cooking device, which can prevent the oil fumes from entering the cavity of the main unit.

This application provides an air cooking device, which includes a main unit and a drawer structure, wherein the main unit is provided with a cavity. The drawer structure may include a drawer panel and a frying bucket fixed on the back side of the drawer panel. The drawer structure can be pushed into the cavity to perform the operation of air frying cooking. The main unit may include a top wall above the cavity, and the air cooking device may also include a sealing element. The sealing element may be provided between a mouth portion of the frying bucket and the top wall of the cavity to prevent the oil fumes from being discharged through the edge of the mouth portion of the frying bucket.

In some implementations, the air cooking device of the above-mentioned technical solution may include a sealing element, wherein the sealing element is provided between the mouth portion of the frying bucket and the top wall of the cavity, to prevent the oil fumes from being discharged through the edge of the mouth portion of the frying bucket, to prevent the oil fume from contaminating the side wall and the bottom wall of the cavity, and to improve user experience.

Further, the main unit may be provided with an upwardly pushing structure, which can lift the drawer structure upwards, thereby realizing the sealing between the mouth portion of the frying bucket and the top wall of the cavity.

Further, the sealing element may be assembled on the edge of the mouth portion of the frying bucket, such that the sealing element is sealed with the top wall.

In some implementations, the sealing element of the above-mentioned technical solution may be assembled on the edge of the mouth portion of the frying bucket, such that the sealing element is sealed with the top wall to facilitate the assembly of the sealing element.

Further, the main unit may include the bottom wall below the cavity, wherein the upwardly pushing structure extends from the bottom wall into the cavity. Thus, when the frying bucket is pushed into the cavity, the upwardly pushing structure pushes up the frying bucket, so that the sealing element and the top wall can fit and seal.

Further, the upwardly pushing structure may include a first supporting portion and a guiding surface extending obliquely and downwardly from the first supporting portion, to guide the frying bucket to move to abut against the first supporting portion.

In some implementations, the upwardly pushing structure of the above-mentioned technical solution may include a first supporting portion and a guiding surface extending obliquely and downwardly from the first supporting portion, to guide the frying bucket to move to abut against the first supporting portion. Thus, by providing the guiding surface, it is possible to increase the pushing and pulling smoothness of the drawer structure.

Further, the main unit may include a second supporting portion for supporting the drawer panel.

In some implementations, the main unit of the above-mentioned technical solution may include a second supporting portion to support the drawer panel, which can effectively ensure the balance of the frying bucket and prevent the frying bucket from tilting.

Further, the frying bucket may include a guiding inclined surface, wherein during the process of pushing the frying bucket into the cavity, the guiding inclined surface moves along the guiding surface.

In some implementations, the frying bucket of the above-mentioned technical solution may include the guiding inclined surface, wherein during the process of pushing the frying bucket into the cavity, the guiding inclined surface moves along the guiding surface, which can increase the pushing and pulling smoothness of the drawer structure.

Further, the frying bucket may include a bottom and an air exhaust port arranged at the bottom, wherein the air cooking device also includes an air exhaust box, and the air exhaust box includes an air inlet, an air outlet, and a cooling flow channel connecting the air inlet and the air exhaust port. The oil fumes may be discharged through the air exhaust port, the air inlet, the cooling flow channel and the air outlet.

In some implementations, the air exhaust box of the above-mentioned technical solution may include an air inlet, an air outlet, and a cooling flow channel that connects the air inlet with the air exhaust port. The oil fume may be exhausted through the air exhaust port, the air inlet, the cooling flow channel and the air outlet, which can effectively extend the path when the oil fumes are exhausted, and reduce the temperature of the oil fumes as much as possible when the oil fumes are exhausted.

Further, the frying bucket may include ring-shaped retaining ribs extending upward from the bottom, wherein the air exhaust port is provided on the inner side of the retaining ribs, to prevent condensed oil-water mixture in the frying bucket from flowing into the air exhaust port.

In some implementations, the frying bucket of the above-mentioned technical solution may include the ring-shaped retaining ribs extending upward from the bottom, wherein the air exhaust port is provided on the inner side of the retaining ribs, to prevent condensed oil-water mixture in the frying bucket from flowing into the air exhaust port, and further prevent the condensed oil-water mixture from flowing into the air exhaust box, so as to prevent contamination of the air exhaust box.

Further, the air exhaust box may include an air inlet nozzle protruding upward from the upper surface of the air exhaust box, where the air inlet is arranged on the air inlet nozzle, and the air exhaust box also includes a sealing ring sleeved on the air inlet nozzle.

In some implementations, the air exhaust box of the above-mentioned technical solution may include an air inlet nozzle protruding upward from the upper surface of the air exhaust box, where the air inlet is arranged on the air inlet nozzle, and the air exhaust box also includes a sealing ring sleeved on the air inlet nozzle, to prevent the water vapor from escaping from the air inlet nozzle.

Further, the main unit may include a receiving cavity under the cavity, wherein the air exhaust box is pushed into the cavity from one side of the main unit.

In some implementations, the main unit of the above-mentioned technical solution may include a receiving cavity under the cavity, wherein the air exhaust box is pushed into the cavity from one side of the main unit, to facilitate the assembly and removal of the air exhaust box.

Further, the air exhaust box may be assembled at the bottom of the frying bucket.

In some implementations, the air exhaust box of the above-mentioned technical solution may be assembled at the bottom of the frying bucket, such that when the drawer structure is taken out, the air exhaust box can be brought out together, which is convenient for operation. At the same time, the main unit does not need to provide a receiving cavity, and the structure remains simple. In addition, it also may be helpful to the alignment of the air intake of the air exhaust box with the air exhaust port of the frying bucket.

Further, the air exhaust box may be enclosed to define a cavity, wherein the air exhaust box includes a retaining wall located in the cavity, and the retaining wall separates the air inlet and the air outlet.

In some implementations, the air exhaust box of the above-mentioned technical solution may be enclosed to define a cavity, wherein the air exhaust box includes a retaining wall located in the cavity, and the retaining wall separates the air inlet and the air outlet. Thus, it may extend the path that the water vapor passes when it is exhausted, and thus it is possible to reduce the temperature of the water vapor when it is exhausted.

Further, the frying bucket may be provided with multiple air exhaust ports, while the air exhaust box may be provided with multiple air inlets, wherein the retaining wall divides the air exhaust box into an entrance area surrounding the outer side of the air exhaust box and the connection area on the inner side of the entrance area. The multiple air inlets may be distributed in the entrance area, and the water vapor generated from the frying bucket may enter the entrance area through the multiple air inlets, then flow into the connection area in a clockwise direction, and then flow in the connection area in a counterclockwise direction to the air outlet. The air exhaust box may include an upper lid and a lower lid. The lower lid may include a bottom wall and a bonding portion extending upward from the bottom wall. The lower surface of the bonding portion may form an upward recess, and the upper surface of the bonding portion may be bonded and fitted to the upper lid. The air cooking device may include the fixing element assembled in the air exhaust box and the frying bucket, to detachably fix the air exhaust box to the bottom of the frying bucket. The fixing element may be at least partially located in the recess of the bonding portion. The outer edge of the lower lid may extend upward to form a cavity that can accommodate a certain amount of condensed water.

In some implementations, the frying bucket of the above-mentioned technical solution may be provided with multiple air exhaust ports, and the air exhaust box is provided with multiple air inlets, wherein the retaining wall divides the air exhaust box into an entrance area surrounding the outer side of the air exhaust box and the connection area on the inner side of the entrance area. The multiple air inlets may be distributed in the entrance area, and the water vapor generated from the frying bucket may enter the entrance area through the multiple air inlets, then flow into the connection area in a clockwise direction, and then flow in the connection area in a counterclockwise direction to the air outlet. Thus, the path through which the water vapor is exhausted is extended, and the temperature the exhausted water vapor is reduced. The air exhaust box may include an upper lid and a lower lid, with the lower lid including a bottom wall and a bonding portion extending upward from the bottom wall. The lower surface of the bonding portion may form an upward recess, and the upper surface of the bonding portion may be bonded and fitted to the upper lid. The air cooking device may include the fixing element assembled in the air exhaust box and the frying bucket, to detachably fix the air exhaust box to the bottom of the frying bucket. The fixing element may be at least partially located in the recess of the bonding portion. TB providing the bonding portion, it is not only possible to extend the path through which the water vapor is exhausted, but also possible to accommodate the fixing element, which saves space.

DETAILED DESCRIPTION

Here, exemplary implementations will be explained in detail, and examples thereof are shown in the attached figures. When the following description refers to the attached figures, unless otherwise indicated, the same numbers in different attached figures indicate the same or similar elements. The implementations described in the following exemplary implementations do not represent all implementation methods consistent with this application. On the contrary, they are only examples of devices that are consistent with some aspects of this application.

The terminology used in this application is only for the purpose of describing specific implementations, and is not intended to limit this application. Unless otherwise defined, the technical or scientific terms used in this application shall have the usual meanings understood by those with general skills in the field to which this application belongs. "First", "second" and similar words used in this application do not indicate any order, quantity or importance, but are only used to distinguish different components. Similarly, words such as "one piece" or "one", etc. do not mean a quantity limit, but mean that there is at least one. "Multiple pieces" or "several" means two or more. Unless otherwise indicated, similar words such as "front", "rear", "lower" and/or "upper" are only for convenience of description, and are not limited to one position or one spatial orientation. "Including" or "containing" and other similar words mean that the elements or items appearing before the word "including" or "containing" cover the elements or items appearing after "including" or "containing" and their equivalents, and do not exclude other elements or items. Similar words such as "connecting" or "coupling" are not limited to physical or mechanical connections, and may include electrical connections, no matter whether it is direct or indirect. The singular forms of "a kind", "the" and "this" used in this application are also intended to include plural forms, unless the context clearly indicates other meanings. It should also be understood that the term "and/or" as used herein refers to and includes any or all possible combinations of one or more associated listed items.

As shown in FIG. 1 to FIG. 5, the air cooking device disclosed in this application can be an air fryer 100 or other oven that may be designed with air frying function.

The air cooking device includes a main unit 1, a drawer structure 2, an air exhaust box 4 and a sealing element 6. The drawer structure 2 and the air exhaust box 4 are assembled with the main unit 1.

The main unit 1 is provided with an interior cavity 10 and a receiving cavity 11 under the cavity 10. The drawer structure 2 is at least partially assembled into the cavity 10. The air exhaust box 4 is at least partially assembled into the receiving cavity 11. The drawer structure 2 is inserted into the cavity 10 from the front side of the main unit 1, and the air exhaust box 4 is inserted into the receiving cavity 11 from the back side of the main unit 1. The air exhaust box 4 can also be inserted into the receiving cavity 11 from the front side of the main unit 1, or from the left side or right side of the main unit 1.

The drawer structure 2 includes a drawer panel 20, a handle 22 connected to the drawer panel 20, and a frying bucket 21 fixed on the back side of the drawer panel 20. The handle 22 is located on the outer side of the drawer panel 20. The frying bucket 21 can be detachably assembled with the drawer panel 20, and it can also be fixedly connected with the drawer panel 20 so that it cannot be disassembled. The drawer structure 2 can be pushed into the cavity 10 to perform the operation of air frying cooking.

The main unit 1 includes a top wall 12 located above the cavity 10, a bottom wall 13 located below the cavity 10, and a side wall 17 located on the side of the cavity 10. The sealing element 6 is provided between the mouth portion of the frying bucket 21 and the top wall 12 of the cavity 10, to prevent oil fumes from being exhausted through the edge of the mouth portion of the frying bucket 21, and prevent the oil fumes from contaminating the side wall 17 and the bottom wall 13 of the cavity 10.

The main unit 1 also includes an upwardly pushing structure 14, which can lift the drawer structure 2 upwards, thereby realizing a seal between the mouth portion of the frying bucket 21 and the top wall 12 of the cavity 10. In one implementation, the upwardly pushing structure 14 extends from the bottom wall 13 into the cavity 10. The upwardly pushing structure 14 is provided with a first supporting portion 140 at the top end thereof and a guiding surface 141 extending obliquely and downwardly from the first supporting portion 140. The frying bucket 21 includes a guiding inclined surface 214. The guiding surface 141 works together with the guiding inclined surface 214 so that the frying bucket 21 can move up along the guiding surface 141 smoothly. The first supporting portion 140 is used to lift the frying bucket 21 upwards, so that the sealing element 6 can seal the gap between the top wall 12 and the frying bucket 21, and prevent oil fumes in the frying bucket 21 from escaping out of the gap, to prevent the oil fumes from contaminating the outer side of the frying bucket 21 and the side wall 17 and the top wall 12 of the cavity 10.

Figure 1:
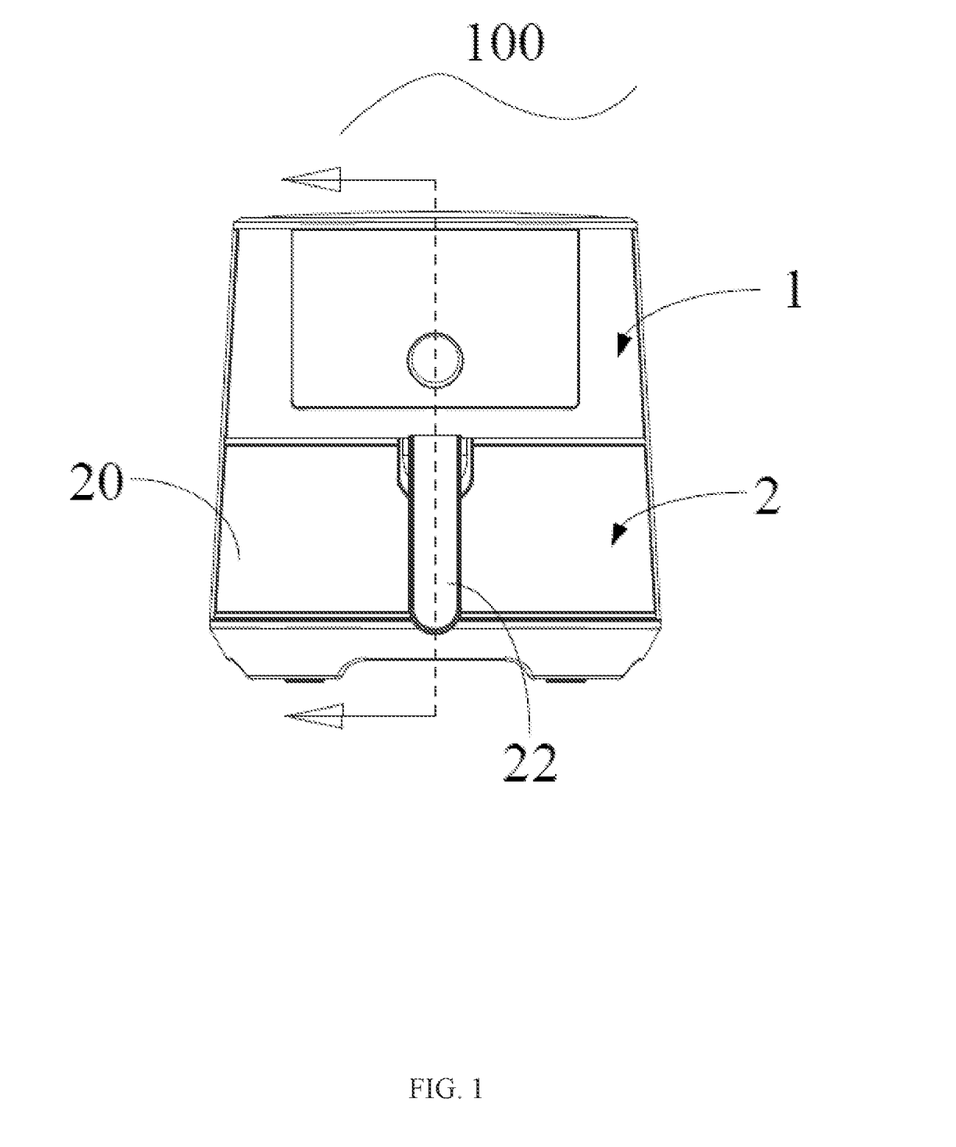
FIG. 1 is a schematic diagram of a first implementation of an air cooking device according to this application.
Figure 2:
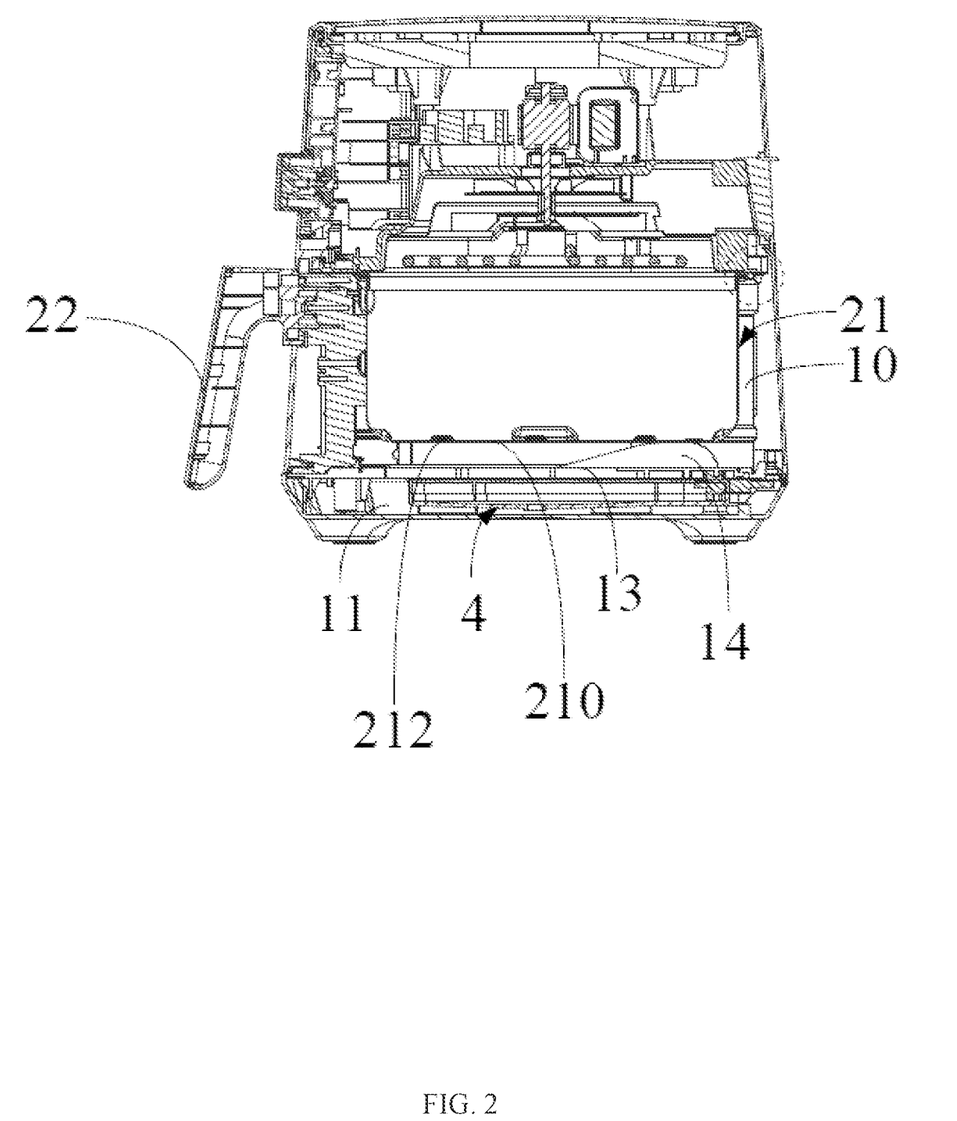
FIG. 2 is a schematic cross-sectional view of the air cooking device along the line A-A shown in the FIG. 1.
Figure 4:
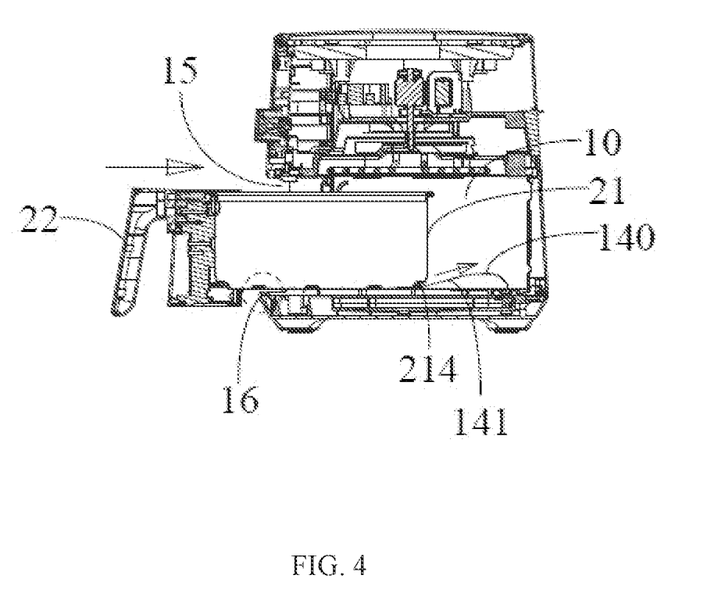
FIG. 4 is similar to FIG. 2, in which the drawer structure is not fully assembled into the main unit.

The main unit 1 is provided with an opening 15, and the drawer structure is inserted into the cavity 10 from the opening 15.

The main unit 1 also includes a second supporting portion 16 near the opening 15 to support the drawer panel 20, so as to ensure the balance of the frying bucket 21 and prevent the frying bucket 21 from tilting.

Figure 3:
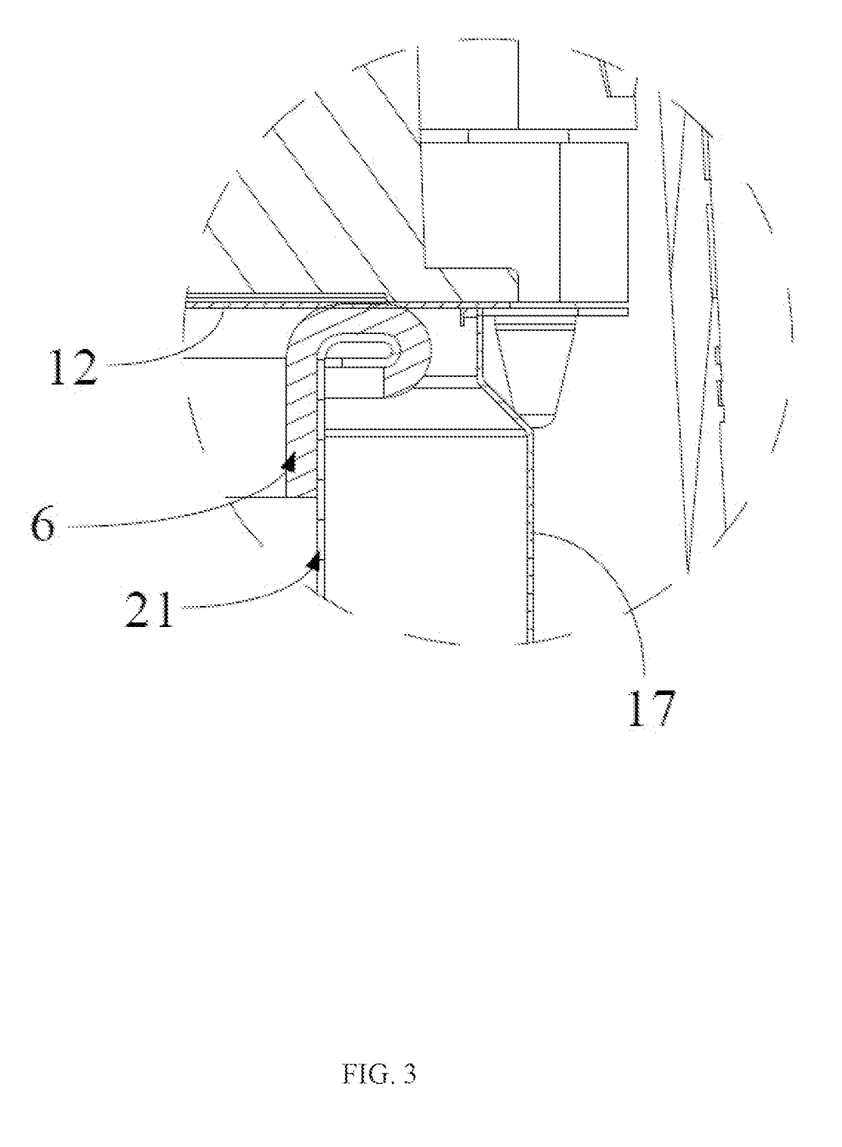
FIG. 3 is an enlarged view of the circled part of the air cooking device shown in the FIG. 2.
Figure 5:
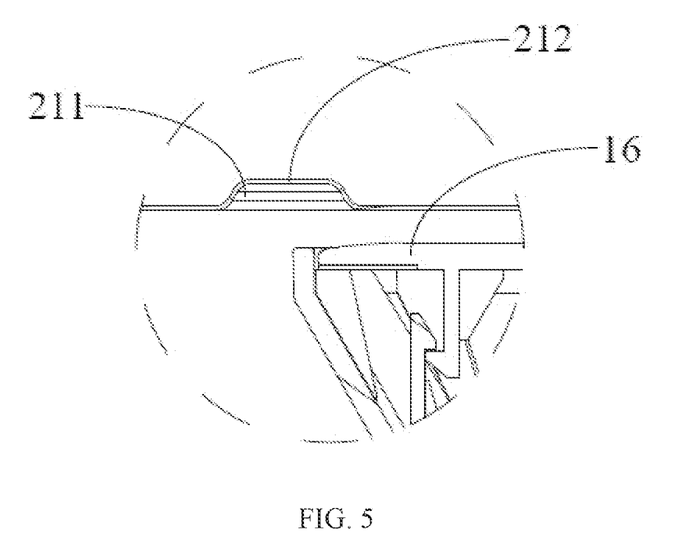
FIG. 5 is an enlarged view of the circled part of the cross-sectional schematic diagram shown in the FIG. 4.

The sealing element 6 can be assembled on the edge of the mouth portion of the frying bucket 21 or on the top wall 12 of the main unit 1. The sealing element 6 can also be integrated with the frying bucket 21 or the top wall 12. It is also not necessary to provide the sealing element 6, because the frying bucket 21 is pushed up by the upwardly pushing structure 14 and then abuts against the top wall 12, which can also prevent oil fumes from escaping the frying bucket 21.

The frying bucket 21 includes a bottom 210 and multiple ring-shaped retaining ribs 211 extending upward from the bottom 210. The frying bucket 21 also includes an air exhaust port 212 arranged on the inner side the retaining ribs 211. The air exhaust port 212 is used for oil fumes or water vapor to escape. The retaining ribs 211 can prevent the condensed oil-water mixture in the frying bucket 21 from flowing into the air exhaust port 212, and further prevent the condensed oil-water mixture from flowing into the air exhaust box 4.

Figure 6:
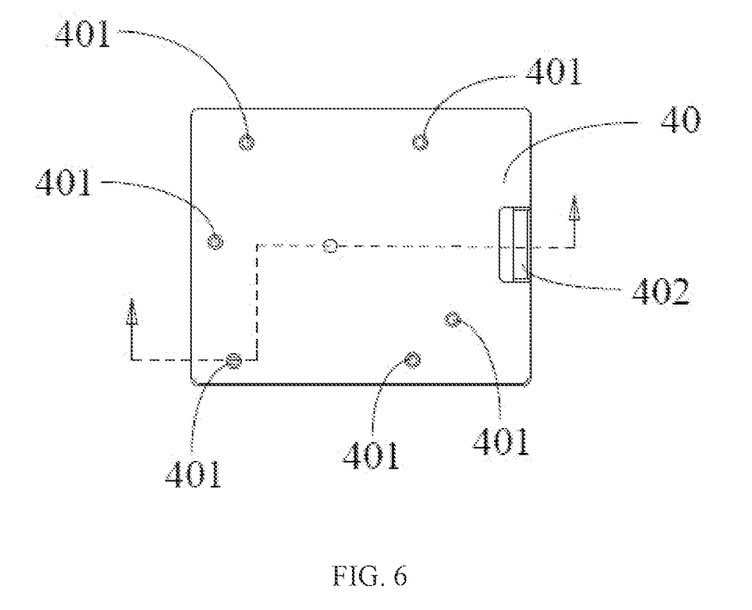
FIG. 6 is the top view of the air exhaust box of the air cooking device shown in the FIG. 1.
Figure 7:
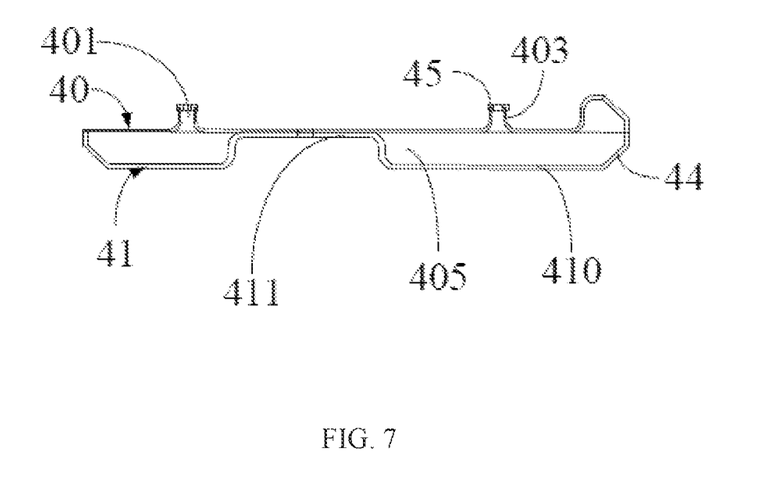
FIG. 7 is a schematic cross-sectional view of the air exhaust box shown in the FIG. 6 along the line B-B.
Figure 8:
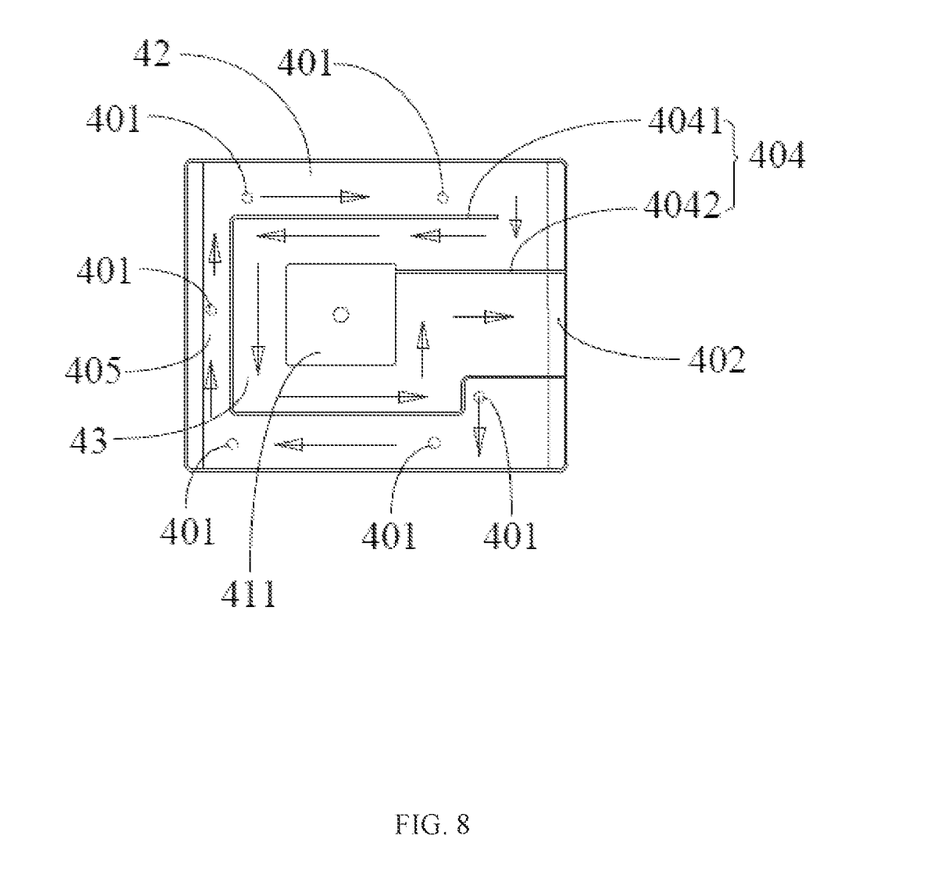
FIG. 8 is a top view of the lower lid of the air exhaust box shown in FIG. 6, which shows the projection of the air inlet of the upper lid on the lower lid, and the direction of the arrow is the path when the oil fume is discharged.

With reference to the FIG. 6 to the FIG. 8, the air exhaust box 4 includes an upper lid 40 and a lower lid 41 assembled together. The outer edge of the lower lid 41 extends upward to form a cavity 405, which can accommodate a certain amount of condensed water. The cavity 405 is provided with a cooling channel to extend the path through which the water vapor passes, so as to reduce the temperature when the water vapor is exhausted. The upper lid 40 includes multiple air inlets 401 and an air outlet 402. The cooling channel connects the air inlet 401 and the air outlet to extend the path from the air inlet 401 to the air outlet, so as to reduce the temperature when the water vapor is exhausted. The air inlet 401 is aligned with the air exhaust port 212 of the frying bucket 21, so that the oil fumes can enter the cavity 405 through the air exhaust port 212 and the air inlet 401, and then be exhausted from the air outlet 402.

The upper lid 40 includes an air inlet nozzle 403 protruding upward from its upper surface. The air inlet 401 is provided in the air inlet nozzle 403. The air exhaust box 4 also includes a sealing ring 45 provided in the air inlet nozzle 403 to ensure that the oil fume can enter the air inlet 401. The upper lid 40 or lower lid 41 is provided with a retaining wall 404 located in the cavity 405. The retaining wall 404 separates the air inlet 401 and the air outlet 402, and only after the oil fume that enters the cavity 405 moves along the retaining wall 404 to the air outlet 402, it can enter the outside space, so as to extend the path of the oil fumes and reduce the temperature of the oil fumes when exhausted.

In one implementation, the retaining wall 404 divides the air exhaust box 4 into the entrance area 42 surrounding the outer side of the air exhaust box 4 and a connection area 43 on the inner side of entrance area 42, and the multiple air inlets 401 are distributed in the entrance area 42. The water vapor generated from the frying bucket 21 enters the entrance area 42 through the multiple air inlets 401, then flows into the connecting area 43 in a clockwise direction, and flows in the connecting area 43 in a counterclockwise direction to the air outlet 402, to extend the length of the cooling channel, and so as to reduce the temperature as much as possible when the water vapor is exhausted.

The air inlet 401 can also be provided in the connection area 43.

The lower lid 41 includes a bottom wall 410, and the retaining wall 404 is formed by extending it from the bottom wall 410. The bottom wall 410 abuts against the upper lid 40, to block oil fumes. The retaining wall 404 includes a first retaining wall 4041 and a second retaining wall 4042. The second retaining wall 4042 is located in the space enclosed by the first retaining wall 4041, to further extend the oil fume path and reduce the temperature when the oil fume is exhausted from the air exhaust box 4. One end of the first retaining wall 4041 is connected to the lower lid 41, and between the other end and the lower lid 41, a notch portion for the oil fume to pass through is formed. Or, the first retaining wall 4041 is provided with a notch portion for the oil fume to pass through.

The lower lid 41 also includes a bonding portion 411 extending upward from the bottom wall 410. The bonding portion 411 is connected to the second retaining wall 4042. The bonding portion 411 is bonded and fitted to the upper lid 40, and after the oil fume bypasses the bonding portion 411, it is exhausted through the gap between the bonding portion 411 and the first retaining wall 4041.

Figure 9:
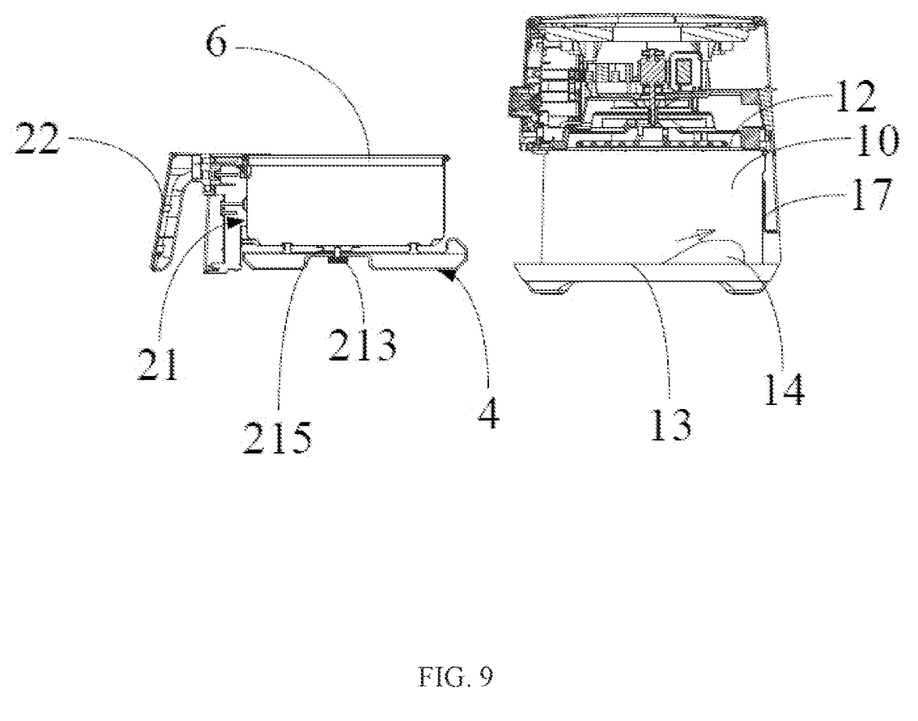
FIG. 9 is a schematic diagram of another implementation of the air cooking device shown in FIG. 1, in which the drawer structure is not assembled into the main unit.

With reference to the FIG. 9, the air exhaust box 4 can also be assembled on the bottom 210 of the frying bucket 21. That is, the frying bucket 21 may include a holding portion 215. The air exhaust box 4 may be assembled on the holding portion 215 through a fixing element 213.

The fixing element 213 can be a screw or a bolt, etc., to facilitate the disassembly of the air exhaust box 4. The air exhaust box 4 may include a guiding portion 44, to guide the air exhaust box 4 to move along the guiding surface 141 of the upwardly pushing structure 14, so as to ensure the smooth assembly of the drawer structure 2.

The lower surface of the bonding portion 411 forms an upward recess, and the upper surface of the bonding portion 411 is bonded and fitted to the upper lid 40. The fixing element 213 passes through the bonding portion 411 of the air exhaust box 4, to be fixed to the holding portion 215 of the frying bucket 21. The fixing element 213 is accommodated in the recess formed by the bonding portion 411, to save space. By providing the bonding portion 411, it is not only possible to extend the path that the oil fume passes through, but also possible to save the space occupied by the fixing element 213 and reduce the volume of the air cooking device.

The air cooking device of the implementations of this application includes a main unit 1, a drawer structure 2 and a frying bucket 21, wherein the main unit 1 is provided with a cavity 10 and a top wall 12 located above the cavity 10. The drawer structure 2 is connected to the frying bucket 21 and when at least partially assembled into the cavity 10, it is sealed between the frying bucket 21 and the top wall 12, to prevent oil fumes from being exhausted through the edge of the mouth portion of the frying bucket 21, and so as to prevent the oil fumes from contaminating the side wall 17 and the bottom wall 13 of the cavity 10, and thereby improve user experience.

The above description is only the preferable implementation for this application, and does not impose any formal restriction on this application. Although this application has been disclosed as above with the preferable implementation, it is not used to limit this application. Any technical person who is familiar with this field can use the technical content disclosed above to make some changes or modifications and still fall within the scope of the technical solution of this application. Any simple modifications, equivalent changes and modifications made to the above implementations based on the technical essence of this application that do not deviate from the content of technical solution of this application are still within the scope of the technical solution of this application.

The invention claimed is:

1. A cooking device comprising:
   a main unit provided with an internal cavity defined by a top wall above the internal cavity and a bottom wall below the internal cavity;
   a drawer comprising a cooking bucket, the drawer being removably insertable into the internal cavity to perform cooking, the cooking bucket comprising an upward facing mouth portion;
   a sealing element positioned between the top wall of the internal cavity and the mouth portion of the cooking bucket surrounding the mouth portion, the sealing element configured to prevent fumes generated during cooking from entering the internal cavity; and,
   an upward projecting ramp positioned on the bottom wall of the internal cavity, the upward projecting ramp configured to lift the cooking bucket upward upon insertion into the internal cavity into sealing engagement between the mouth portion of the cooking bucket and the top wall of the internal cavity; and,
   wherein the upward projecting ramp is positioned in a rear portion of the internal cavity.

2. The air cooking device of claim 1, wherein the sealing element is configured to prevent the fumes from being discharged from the cooking bucket between the top wall and the mouth portion.

3. The air cooking device of claim 1, wherein the sealing element is associated with the cooking bucket, the sealing element surrounding the mouth portion.

4. The air cooking device of claim 1, wherein the sealing element is associated with the top wall of the internal cavity, the sealing element positioned to surround the mouth portion when the cooking bucket engages with the top wall of the internal cavity.

5. The air cooking device of claim 1, wherein the upward projecting ramp includes a first surface at a top end thereof and a guiding surface extending obliquely between the first surface and the bottom wall.

6. The air cooking device of claim 1, wherein the upward projecting ramp is configured to lift the cooking bucket upward upon insertion into the internal cavity into sealing engagement between the mouth portion of the cooking bucket and the top wall of the internal cavity.

7. The air cooking device of claim 1, wherein the cooking bucket includes a leading inclined surface configured to engage the upward projecting ramp when the drawer is inserted into the internal cavity.

8. The air cooking device of claim 1, further comprising an exhaust flow path defined between an exhaust port in communication with the cooking bucket and an exhaust outlet of the air cooking device.

9. The air cooking device of claim 8, wherein the cooking bucket comprises the exhaust port.

10. The air cooking device of claim 8, further comprising an air exhaust box, the air exhaust box comprising an exhaust inlet in communication with the exhaust port, the exhaust outlet of the air cooking device, and a flow channel defined between the exhaust inlet and the exhaust outlet, wherein fumes are discharged from the cooking bucket through the exhaust port, the exhaust inlet, the flow channel, and the exhaust outlet.

11. The air cooking device of claim 10, wherein the main unit includes a receiving cavity under the internal cavity, wherein the air exhaust box is removably insertable into the receiving cavity from one side of the main unit.

12. A cooking device comprising:
- a main unit provided with an internal cavity defined by a top wall above the internal cavity and a bottom wall below the internal cavity;
- a drawer comprising a cooking bucket, the drawer being removably insertable into the internal cavity to perform cooking, the cooking bucket comprising an upward facing mouth portion; and,
- a sealing element is positioned between the top wall of the internal cavity and the mouth portion of the cooking bucket surrounding the mouth portion to prevent fumes generated during cooking from being discharged from the cooking bucket between the top wall and the mouth portion;
- an upward projecting ramp positioned on the bottom wall of the internal cavity, the upward projecting ramp configured to lift the cooking bucket upward upon insertion into the internal cavity, thereby sealingly engaging the mouth portion of the cooking bucket and the top wall of the internal cavity;
- wherein the fumes are exhausted from the main unit without entering the internal cavity; and,
- wherein the upward projecting ramp is positioned in a rear portion of the internal cavity.

13. The air cooking device of claim 12, wherein the sealing element is associated with the cooking bucket, the sealing element surrounding the mouth portion.

14. The air cooking device of claim 12, wherein the sealing element is associated with the top wall of the internal cavity, the sealing element positioned to surround the mouth portion when the cooking bucket is inserted into the internal cavity.

15. The air cooking device of claim 12, wherein the upward projecting ramp includes a first surface at a top end thereof and a guiding surface extending obliquely between the first surface and the bottom wall.

16. The air cooking device of claim 12, wherein the upward projecting ramp is configured to lift the cooking bucket upward upon insertion into the internal cavity into sealing engagement between the mouth portion of the cooking bucket and the top wall of the internal cavity.

17. The air cooking device of claim 12, wherein the cooking bucket includes a leading inclined surface configured to engage the upward projecting ramp when the drawer is inserted into the internal cavity.

18. The air cooking device of claim 12, further comprising an exhaust flow path defined between an exhaust port in communication with the cooking bucket and an exhaust outlet of the air cooking device.

19. The air cooking device of claim 18, wherein the cooking bucket comprises the exhaust port.

20. The air cooking device of claim 15, wherein the main unit includes a second surface positioned near an opening to the internal cavity, the second surface configured to balance the drawer when the upward projecting ramp lifts the cooking bucket upward.

* * * * *